Patented July 23, 1929.

1,721,930

UNITED STATES PATENT OFFICE.

CHARLES M. STINE AND COLE COOLIDGE, OF WILMINGTON, DELAWARE, ASSIGNORS TO E. I. DU PONT DE NEMOURS & COMPANY, OF WILMINGTON, DELAWARE, A CORPORATION OF DELAWARE.

COATING COMPOSITION AND PROCESS OF MAKING.

No Drawing. Application filed July 3, 1925. Serial No. 41,410.

This invention relates to coating compositions. More specifically it relates to paint and varnish liquids in which rubber is incorporated with an oil and processes of making the same, and has for its object certain improvements in the working properties of such compositions.

In the patent to Charles M. Stine, No. 1,663,100, filed December 19, 1923, methods have been disclosed for the preparation of improved coating compositions, by combining crude rubber with oil; therein is also disclosed the fact that films produced from such liquids, either with or without the incorporation of pigments, may be hardened by proper heating and further, that the drying or hardening of such films may be promoted by the incorporation of driers or curing and vulcanizing agents.

We have now developed certain improvements in the working properties of such compositions by the use of "depolymerized" or "de-aggregated" rubber. Rubber-containing compositions, in particular varnish liquids, in which the rubber is in a state of de-aggregation, have been found to possess certain desirable properties not possessed by compositions containing ordinary rubber.

In order to avoid possible misunderstanding we will define certain terms in the sense in which they are employed throughout this specification. By the term "de-aggregated" or "depolymerized" rubber, we mean any variety or type of rubber which has undergone in solution a loss in viscosity or body to any extent ranging from an appreciable loss in viscosity to a loss to the point of minimum viscosity for any definite concentration of rubber in any specific solvent; this loss in viscosity being due presumably to greater dispersion of the rubber particles. The preparation of such rubber will be explained in detail hereinafter.

In the use of the term "rubber," we do not wish to limit ourselves to crude or unvulcanized rubber, although the use of this variety is to be preferred in the practice of our invention. In the interpretation of our claims, the term "rubber" is meant to include crude or unvulcanized caoutchouc, under which head may be included all the botanical varieties such as Hevea, balata, gutta percha, etc., and as well includes vulcanized rubber of any botanical variety in the state of partial to complete vulcanization; as well as reclaimed rubber.

The term "oil" whenever used covers animal, vegetable or mineral oil, including all types of drying, semi-drying and non-drying oils and, as well, specially treated oils such as blown or ozonized oils.

By the term "drier" is meant a salt or an oxide of a metal such as cobalt, lead, manganese, zinc, etc., which functions probably as a carrier of oxygen; thereby catalizing the oxidation of oil, as well as the curing of the rubber; bringing about thru such reaction, in solution, usually a loss in viscosity due to the de-aggregation of the rubber. Finely divided metals will also sometimes function as driers (see Morrell, Varnishes and Their Compositions, London, 1923).

The terms "thinner" and "pigment" when used will have the meaning commonly assigned them in ordinary paint and varnish practice.

Perhaps the most striking feature of de-aggregated rubber solutions is their low viscosity as compared with the viscosity of ordinary rubber solutions. As an example, we have found that a 10% solution of ordinary rubber in benzine containing rubber previously subjected to ordinary plasticization may have a viscosity as high as 2500 when measured with a Scott orifice viscosimeter (described in "White Paints and Painting Materials" by W. T. Scott, pages 440-441), as compared with 10% solutions of de-aggregated rubber in benzine, having viscosities of 35 or less when measured in the same manner. This enormous difference in body or viscosity between the two types of rubber solutions can be utilized to advantage in many ways in the preparation of coating compositions.

Various methods for de-aggregating rubber may be employed and the following are given as examples, only:

(1) Rubber which has been suitably plasticized by milling according to prior art may be dissolved in benzol, turpentine or certain petroleum distillates and drier incorporated therein to give a substantially homogeneous solution which, on aging in the presence of air or on suitable agitation, will become de-aggregated. As an example, illustrative of the above procedure, 2 pounds of rubber are plasticized on a rubber mill for a period of 20 minutes and then dissolved in 18 pounds of benzine, with the aid of mechanical agitation. To this solution is added .01 pound of cobalt linoleate dissolved in .04 pound of turpentine and the whole mixture vigorously agitated in the contact with the air for approximately 60 hours. The agitation should be such that air is churned into the solution. At the end of this period it will be found that the viscosity of the solution has dropped to a value of about 40 seconds (by the Scott viscosimeter) as compared to the initial viscosity of about 2500 seconds.

(2) Likewise, rubber which has been suitably plasticized by milling may be dissolved in turpentine or compounds chemically similar which have been oxidized by the passage of air or oxygen through them, and on proper aging will become de-aggregated. The following example will serve to illustrate the above process: Two pounds of rubber previously milled for 20 minutes are dissolved in 18 pounds of oxidized turpentine. The oxidized turpentine is prepared by blowing oxygen through turpentine for 24 hours. The above rubber solution is then vigorously agitated in contact with the air for 120 hours, when it is found that the viscosity has dropped to a figure of about 80 seconds (Scott viscosimeter) as compared to the initial viscosity of about 2700 seconds.

(3) Certain chemicals compounds such as acetic acid, or its substitution products formed by chlorination, benzoic and formic acids, etc., also have the power of de-aggregating rubber solutions. The example given below illustrates the above procedure: Two pounds of rubber milled for 20 minutes is dissolved in 18 pounds of benzole. To this solution is added .02 pound of trichloracetic acid and the mixture mechanically agitated for about 90 hours when the viscosity will have dropped to a value of about 55 seconds (Scott viscosimeter) as compared to an initial viscosity of about 2400 seconds.

Regardless of the method used to bring about de-aggregation we claim the discovery that rubber, which has been de-aggregated, may be incorporated with a drier, with or without oils, to give coating compositions which, when exposed to the atmosphere or heated in the form of thin films, will give protective coatings of great durability, hardness and flexibility. Moreover, pigments may be incorporated in such compositions to give color varnishes or enamels having the same desirable properties.

One of the principal advantages resulting from the use of de-aggregated rubber is an improvement in the ease with which the resulting composition can be applied to various surfaces. This feature is important, for in many cases it makes the use of such compositions practicable in the arts where otherwise they would not be. For example, solutions of such rubber can be satisfactorily sprayed, using the standard types of spray guns. Accordingly, products containing de-aggregated rubber can, in general, be successfully sprayed in practical use. This is distinctly a novel feature since rubber solutions of ordinary viscosity (in the case of a 10% solution, around 2500 seconds, Scott viscosimeter) do not spray satisfactorily, but tend to "string" when atomized, and, as well, give unsatisfactory sprayed films, showing "pebbling" or "sags."

Since de-aggregated rubber solutions have, in general, a comparatively low viscosity, it is possible to prepare such solutions of comparatively high rubber concentration, and although such concentration be as high as 40% rubber content, the viscosity will be comparatively low (around 75 seconds by the Scott viscosimeter). Accordingly, dry films produced from products containing de-aggregated rubber solutions will have substantially greater film thickness than films prepared from products containing rubber solutions of normal viscosity. The advantages of a greater film thickness are obvious, since substantially greater durability, waterproofness, and reduction in number of coats may be secured.

In the patent to Stine and Coolidge, No. 1,663,101, filed September 5, 1924, it was pointed out that metallic driers, as well as certain pigments, presumably caused a loss in viscosity of rubber solutions which was serious, inasmuch as such products lost some of their valuable properties. In co-pending application Serial No. 736,017, filed September 5, 1924, products and processes for preventing such loss in viscosity of rubber solutions were described. However, where de-aggregated rubber solutions are used there can be, in general, substantially no further loss in viscosity. This is obviously a very important and desirable condition, inasmuch as products containing de-aggregated rubber will be more stable, chemically and physically.

In a co-pending application agents for the prevention of "lobbering" of rubber varnishes and enamels caused by the action of certain pigments on the rubber in such products were described. It has been found that solutions of de-aggregated rubber apparently do not "lobber" when brought into contact with pigments normally causing "lobbering" with aggregated or normal rubber. The use of de-aggregated rubber, therefore, permits the incorporation of practically any pigment without the subsequent danger of the resulting product "lobbering", and, accordingly, substantially increases the scope and stability of such products.

The following formula in which the proportions are indicated by weight will illustrate one type of varnish liquid containing de-aggregated rubber:

|  | Parts. |
|---|---|
| De-aggregated rubber (as dry rubber) | 108 |
| Bodied Perilla oil | 148 |
| Cobalt linoleate | 2.1 |
| Benzine | 452 |

Pigments may, of course, be incorporated in the above formula to give enamels or color varnishes. Moreover, the oil may be omitted to give a clear rubber varnish which will yield a very durable, protective coating on air drying or heating.

Still another type of coating composition is prepared by incorporating both crude (aggregated) and de-aggregated rubber with oil and drier with or without pigment to give protective coatings having still other desirable properties.

The advantages secured by the use of mixtures of de-aggregated rubber with ordinary (aggregated) rubber combine the advantages of both types of rubber. On the one hand, solutions of aggregated rubber exhibit unusually good flowing properties, while on the other hand solutions of de-aggregated rubber possess exceptionally desirable spraying properties, with the result that combinations of these two types of rubber and coating compositions permit, in certain cases, good flowing and spraying of the product, and, as well, usually improve the brushing properties. Further, the addition of de-aggregated rubber to products containing some normal rubber will naturally assist somewhat in preventing loss in viscosity and, as well, remove to some extent the danger of "lobbering" where certain pigments are used.

The type of varnish liquid, containing both crude (aggregated) and de-aggregated rubber, is illustrated by the following formula in which the proportions are indicated by weight:

|  | Parts. |
|---|---|
| Bodied Perilla oil | 168 |
| Crude rubber (as dry rubber) | 19.2 |
| De-aggregated rubber (as dry rubber) | 47.7 |
| Black pigment | 30 |
| Cobalt linoleate | 1.2 |
| Benzine | 365 |

The above data are for illustrative purposes only, and in no way limit the nature or proportion of ingredients. The ratio of oil to rubber may be increased up to 7800 parts oil per 100 parts rubber. The ratio of oil and rubber to drier is also capable of wide variation depending on the particular purpose for which the coating composition is designed. In general, however, the proportion of drier lies between .001% and 10% based on the weight of the oil and rubber combined.

To summarize our invention, we have found that lacquers, varnish liquids, enamels, etc., may be prepared by the mixing of rubber in a state of de-aggregation with a drier and a thinner, with or without oil and with or without pigment. Such coating compositions when properly applied to a surface and air dried or heated suitably will give protective films having greater durability, hardness and flexibility than ordinary varnish films. As set forth in Patent No. 1,663,100, referred to heretofore, the drier functions in the presence of air not only to effect the oxidation of the drying oil (when present), but also effects the cure of the rubber. In the event that de-aggregation is effected by means of a drier, the drier may accomplish all three results: de-aggregation, curing and drying.

We claim:

1. In a process of preparing a coating composition, the steps of dissolving rubber in a volatile solvent to form a solution having a viscosity as high as 2700 seconds (Scott viscometer) and agitating said solution in the presence of oxygen until the viscosity has dropped to as low as 80 seconds.

2. In a process of preparing a coating composition comprising rubber, the steps of dissolving the rubber in a volatile solvent and agitating the solution in the presence of oxygen and an oxidizing catalyst until the viscosity of the solution is no longer reduced.

3. In a process of preparing a coating composition comprising rubber, the steps of dissolving the rubber in a volatile solvent and agitating the solution in the presence of oxygen and an oxidizing catalyst until the viscosity of the solution is no longer substantially reduced and incorporating therewith a drying oil.

4. A process for preparing a coating composition which comprises preparing a substantially homogeneous solution in a volatile solvent of rubber and a drier, and thereafter agitating said solution in the presence of oxygen until its viscosity is no longer substantially reduced.

5. A process of preparing a coating composition of low viscosity which comprises agitating a solution of rubber in a volatile solvent in the presence of oxygen to effect de-aggregation, incorporating a drying oil therewith in an amount less than 78 parts of oil to one of rubber and a metal drier in an amount less than 10% of the weight of the oil and rubber combined.

6. A non-aqueous solution of rubber in an organic solvent, said solution containing at least 10% rubber and having a viscosity not over 80 seconds as measured by the Scott viscometer.

7. A solution of rubber in an organic solvent, said solution containing as high as 40% rubber and having a viscosity of about 75 seconds (by the Scott viscometer).

8. A coating composition in liquid form comprising a non-aqueous solution of uncured rubber in an organic solvent, said solution containing at least 10% rubber and having a viscosity not over 80 seconds as measured by the Scott viscometer, and a metal drier.

9. A coating composition in liquid form comprising a non-aqueous solution of uncured rubber in an organic solvent, said solution containing at least 10% rubber and having a viscosity not over 80 seconds as measured by the Scott viscometer, a metal drier, a drying oil, and a volatile solvent.

10. A coating composition in liquid form comprising a non-aqueous solution of rubber containing over 10% deaggregated rubber, the viscosity of which solution does not exceed 100 seconds (by the Scott viscometer).

11. A coating composition in liquid form comprising deaggregated rubber, a salt of cobalt, Perilla oil, a pigment and benzine.

12. A non-aqueous coating composition comprising substantially completely deaggregated rubber, a drying oil, a salt of cobalt, and a thinner in which the ratio of oil to rubber does not exceed 78.

13. A non-aqueous coating composition comprising substantially completely deaggregated rubber, a drying oil, a salt of cobalt, and a thinner in which the ratio of oil to rubber does not exceed 78, and the ratio of drier to oil and rubber combined does not exceed 1 to 10.

14. A coating composition comprising Perilla oil, crude rubber, completely deaggregated rubber, pigment, a salt of cobalt and benzine.

15. A process of preparing a coating containing cured completely deaggregated rubber and dried drying-oil which comprises the step of effecting the deaggregation and curing of the rubber and drying of the oil by a drier.

16. An article of manufacture having a protective coating prepared from a non-aqueous solution of rubber in an organic solvent, said solution containing at least 10% rubber and a metal drier, and having a viscosity not over 80 seconds as measured by the Scott viscometer.

In testimony whereof we affix our signatures.

CHARLES M. STINE.
COLE COOLIDGE.